Patented May 12, 1936

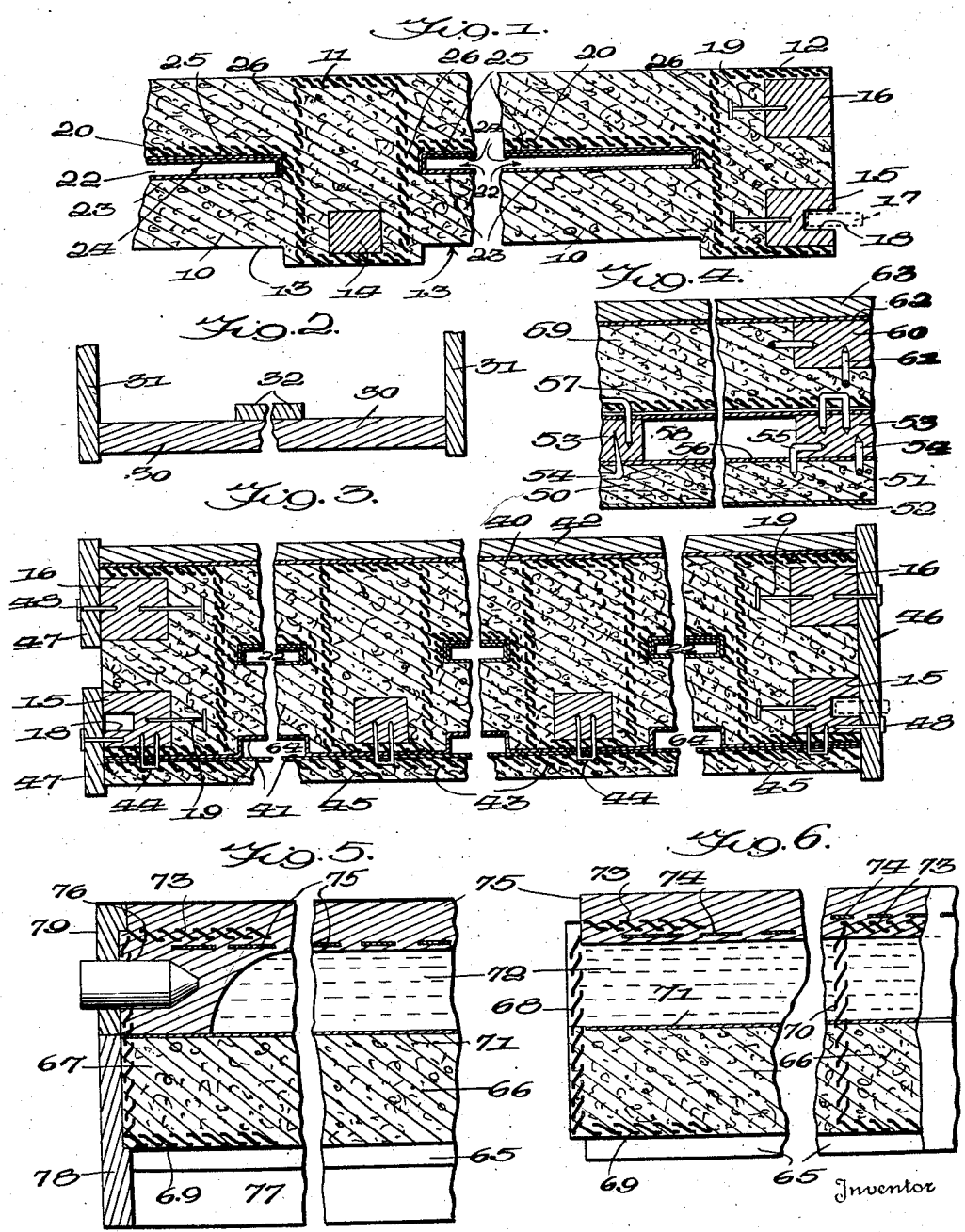

2,040,732

UNITED STATES PATENT OFFICE 2,040,732

MANUFACTURE OF CEMENTITIOUS PANELS

Thomas J. Foster, Ridgewood, N. J.

Application August 20, 1934, Serial No. 740,705

15 Claims. (Cl. 25—154)

This application is a continuation in part of my copending application Ser. No. 594,723, filed February 23, 1932, now Patent No. 2,001,605 dated May 14, 1935, and is intended to include all patentable subject-matter divisible from that claimed in said application.

This invention relates to improvements in building construction and particularly aims to provide an improved light weight moisture, heat and sound proof building panel and an improved method of producing the same. The invention further aims to create from relatively weak materials, such as aerated gypsum, and relatively simple, easily formed reinforcing material, a panel in which these elements cooperate to produce in themselves a rigid self-sustaining structure, and in other respects to improve former panel structures comprising similar light weight heat and sound proof materials wherein rigid walls or frames were used to provide adequate strength.

Another object of my invention is to construct a panel adapted for use in exterior walls composed principally of gypsum or other materials which as heretofore used have been incapable of resisting exposure to moisture and atmospheric conditions.

Further objects of the invention appear hereinafter in connection with the description of the preferred embodiments illustrated in the accompanying drawing, wherein Fig. 1 is a partial sectional view crosswise of the length of a panel body embodying my invention;

Fig. 2 is a sectional view illustrative of a form of mold suitable for use in preparing the panel body shown in Fig. 1;

Fig. 3 is a sectional view similar to Fig. 1 through a panel unit embodying my invention provided with unitary interior and exterior finished faces and supplied with protective strips rendering the same suitable for handling and shipment;

Fig. 4 shows an inexpensive modified form of the invention; and

Figs. 5 and 6 are cross-sectional views showing other modified forms of the invention.

Referring to Fig. 1 of the drawing, the panel structure therein shown comprises a body of set plastic material 10 such as aerated cellular gypsum or the like embedding and reinforced by spaced reinforcing means of the "bond-in" type, such as the longitudinal box-like reinforcing members 11 and 12, of expanded metal or other suitable metal mesh. In the preferred form shown, the body of set plastic material 10 is provided in at least one of its faces with reentrant portions 13, and the box-like reinforcing members 11 and 12 extend through substantially the thickness of the body (i. e. from one face to the other) in the sections of the slab body between the reentrant portions 13.

To facilitate the erection of the panels to form a wall, and to facilitate the attachment of surface finishing materials thereto, I may provide the body 10 with embedded anchoring means such as the nailing strips or blocks 14, 15, 16, which, as shown, are preferably located with metallic reinforcing means, such as portions of the reinforcing members 11 or 12, extending between their nailing faces and the face of the body. This arrangement insures the distribution of any stress tending to pull out the anchoring means to a large area of the body by way of the interposed bonded-in reinforcement and prevents any substantial straining or breakage of the panel structure.

In the form indicated in Fig. 1, the anchoring means 14, which are located intermediate of the width of the panel, will ordinarily be used merely for the attachment of surface finish materials and trim or other superposed elements to the panel body as hereinafter explained with reference to Fig. 3; and the anchoring means 15 and 16, situated in the longitudinal edges of the panel, serve these and other purposes also. For example, the anchoring means 15 and 16 may be used for the temporary fastening of protective strips to the edges of the panels to protect the edges against breakage, as shown in Fig. 3 and explained hereinafter, and they may be used to facilitate alignment of the panels during erection to form a wall. In Figs. 1 and 3, for example, there is shown a form of aligning means comprising tongue and groove elements 17—18 to secure the edges of adjacent panels firmly in place while permitting any slight expansion and contraction caused by atmospheric conditions, shrinkage or settlement.

To insure firm bonding-in of the edge strips or blocks 15, 16, the edge-faces of which set flush with the edge of the body 10, these members are preferably provided with block anchoring means such as staples or T-members 19 secured to the blocks and embedded in the plastic body 10.

In constructing panels of relatively weak light-weight hardening plastic material, such as aerated gypsum, I have found that it is possible to do away with the rigid framing heretofore thought necessary in this type of construction to provide rigidity and strength to the panels, and in accordance with my invention, I locate and bond-in the reinforcing means of expanded metal, wire mesh or other reticulated metal suitable for the purpose, so that the resulting reinforced hardened plastic body, after it has set, itself provides the strength and rigidity of the panel. In this connection I find it desirable to employ, in addition to the longitudinal box-like reinforcements 11 and 12, additional intermediate, transversely extending bonded-in reinforcement, which aids in providing rigidity and strength by distributing any locally applied stresses over a larger area of the panel. In the form shown, this reinforcing means comprises a section 20 of metal mesh or the like, embedded in the body 10 and extending substantially the entire distance between adjacent members of the reinforcing means 11 and 12.

In the preferred form of my invention, as indicated in the drawing, I provide, in addition to or in lieu of air spaces formed by the attachment of surface finishes over the reentrant sections 13, intermediate insulating air spaces 22, the walls of which are preferably treated or coated, as by the application of a layer of heavy, tarry, bituminous or asphaltic material 23, 24, to render them waterproof and additionally heat and sound insulating. In the form shown, the insulating material 23 (which I herein refer to generically as bituminous material as illustrating the qualities believed to be desirable without restricting the range of materials which may be employed within the scope of my invention) is flowed, spread, laid down or painted directly upon a continuous area of the poured body material 10, while the bituminous material 24 is carried by paper or like continuous backing 25 attached to reinforcing member 20 in any suitable manner. For simplicity in construction, and to coat substantially entirely all sides of the air space 22, I turn down the edges of the coated, continuously-backed metal mesh member 20—24—25, as indicated at 26, and this construction not only insulates substantially the entire surface of the air space, but also prevents the poured plastic material 10 (which is very fluid) from finding any substantial entrance thereto. In addition the turned down edges of the reinforcing mesh 20, lying closely adjacent to the mesh of the box-like reinforcing members 11, 12, as shown, and embedded therewith by the set plastic filling, connect and interrelate these reinforcing members so well that wiring or otherwise securing them together may be dispensed with, if desired.

The panel body so far described may itself constitute a building unit and may be erected in the condition shown in Fig. 1, or this body may be coated with bituminous or other waterproofing, sound or heat insulating material or have attached to its faces sections of any desired interior or exterior surface finish material, or both waterproofing and surface finish may be applied, as hereinafter described.

The panel-body shown in Fig. 1 is a basic finished foundation unit of building construction capable of many adaptations to particular constructions without departing from my invention, and my invention contemplates that this subcombination may itself be employed as a complete precast foundation unit in building construction; and thereafter coated or finished in any appropriate manner if desired.

This pre-formed basic unit may be readily cast with the aid of the simple form shown in Fig. 2, which comprises a horizontal floor or bottom 30 having an area equal to the area of panel desired, and a surrounding wall 31 of a height at least equal to the thickness of panel to be cast therein. For forming reentrant sections in the first cast face of the body 10, the form may be provided with any suitable molding strips, blocks or forms 32 of a shape corresponding to that of the reentrant section desired. These mold strips 32 may advantageously be removably attached to the form bottom 30, or merely laid in place therein, so that they may be replaced with similar forms of different size and spacing to adapt the same form bottom to the production of variously modified panel bodies.

A simple method of making the slab of Fig. 1 by using the form illustrated, may be practiced by first placing the preshaped reinforcing means 11 and 12, with the enclosed blocks 14 and 15 in position in the spaces between the mold-blocks 32, and then pouring the grout-like aerated gypsum or other filling into the form to the level A—A, Fig. 1. A grout-like consistency of the filling material, such as is obtained with aerated gypsum, is preferable in the practice of my invention, to facilitate and expedite the bonding in of the reinforcing materials and the leveling of the filling at the line A—A, and it should be noted that this grouty filling passes freely into the interior of the box-like metal-mesh reinforcements 11 and 12 through the reticulated sides thereof.

The bituminous coating 23 may now be applied to the top of the cast filling extending between the reinforcing members 11 and 12, either by flowing it on or laying it down in sheet form, or, after sufficient setting of the filling 10, by painting the surface thereof with a brush, and after this has been done, the coated, continuously-backed, metal mesh 20, 24, 25, having its edges turned down, may be dropped into place to complete the insulating void. When this has been done the pouring of the light weight plastic filling may be completed and its upper surface may be screeded-off at the desired level, advantageously being finished even with the tops of the reinforcing members 11. The blocks 16, which are embedded during the completion of the pouring, may be inserted and held in place by any suitable pins, staples or other supporting means, with reference to the reinforcing 12 or the form walls 31, at any time prior to the completion of the fill.

As shown in Fig. 3, the resulting structure may be coated on its top surface, either before or after removal from the form in which it is built up, with one or more layers 40 of any suitable waterproofing, heat or sound proofing material or combination thereof, and after removal from the form the other face of the panel body may be suitably coated in part or throughout its extent, as indicated at 41.

As is also clearly indicated in Fig. 3, the panel body may have secured to it before erection, if this is desired, any interior surface finish 42, such as pulp-board, plaster-board, gypsum board, imitation stone, imitation wood, wood-veneer "Lincrusta Walton," or other suitable coating or panelling, or in fact any desired finish, which may be cemented on or otherwise secured as by means of nails or tie members engaging the blocks 16.

Likewise the panel body may have an exterior surface or surface foundation applied thereto in any desired manner. In the form shown in Fig. 3, such exterior surface comprises a foundation sheet 43 of continuously backed metal lath or other mesh, which may carry additional waterproofing, and which is readily secured to the anchor means 14, 15 as by staples 44, thus providing a foundation for the application of any cementitious exterior finish 45 such as a stucco finish, either as a part of the pre-formed panel, or after the preformed panel has been erected in place. A metal or other sheet-like finish may be secured in the same manner as the sheet 43.

As above mentioned, whether or not the preformed panel comprises exterior or interior surface finishes, it is desirable to attach protecting strips, as 46 or 47, to its edges to form a shipping unit, these strips covering at least the longitudinal edges of the panel and projecting laterally enough to protect them during transportation and storage. Light nails or brads 48 are preferably used to attach the temporary protecting means to the blocks 15, 16, so as to permit the removal of the protecting means when it has served its purpose. The block anchors 19 insure against breakage of the edges of the panel or loosening of the blocks 15, 16, in prying off, or otherwise removing, the protecting means.

As a rule it will be sufficient for shipping purposes to protect only the longitudinal edges of the panels, which extend vertically when erected, because the other edges will usually be hidden in the finished wall by the floor and ceiling framing, soffits, or other structural parts; but if desired, additional strips may be temporarily secured to the end edges, making a more substantial shipping unit. This may be desirable where considerable rough handling is anticipated, or where the panels are unusually large or heavy, or repeated wetting or aging or other work is to be done on them prior to erection, or where the panels must be carried to awkward locations for erection.

In the practice of my invention I prefer for most types of panel to cast a self-supporting foundation unit such as that shown in Fig. 1 and then apply desired finishes thereto, but my invention is not limited in this respect. For example, in Fig. 4 I have indicated a modified construction in which I first spread in a suitable form a thin layer 50 of external finishing material such as concrete, in which any suitable reinforcement of the "bond-in" type, such as metal mesh, may be embedded as indicated by the dotted line 51. The exterior surface 52 of this concrete layer may be finished in any desired way, as by actual or molded imitation trowelling to resemble trowelled stucco, by spreading crushed stone or pebbles in the slab-form to impart a pebbled or rough stone finish to the surface, or by laying stone or imitation brick veneer therein to be embraced in the poured cement or attached to the surface by the embedding of anchor members secured thereto. Before the hardening of this layer 50 anchor blocks 53, provided with staples or other anchor elements 54, 55 extending from their lower surfaces, may be pressed down into the position shown, the level of these members being determined as accurately as may be necessary by marks or pins on the form, or any suitable means. Preferably, as indicated at 56, the upper surface of the layer 50 is coated with a layer of bituminous material to waterproof and additionally sound-proof the same, and this layer may be applied either before pressing the anchor blocks into place (in which event it will extend under the same as shown) or afterwards.

Provision may advantageously be made for obtaining an insulating air space in the panel body by inserting a continuous, sustained layer of any suitable material to bridge the air spaces desired, as does the material 25, in the body of Fig. 1. It is also desirable to provide means for bonding the light weight plastic filling of the body to the layer 50, thereof, and for additionally anchoring the blocks 53 in place. All of these objects are taken care of in this embodiment of my invention by stapling a layer of continuously backed metal mesh 57, such as the backed mesh 20—25 of Fig. 1, to the several blocks or strips 53, as shown. Preferably this backed mesh, as is the case in Fig. 1, comprises a bituminous waterproofing coating corresponding to the coating 24, Fig. 1, to serve the purpose served thereby, in connection with the air space 58.

The light plastic filling 59 may now be poured (either before or after insertion in place of the anchor blocks 60) and screeded off at the proper level for the panel thickness desired, the block-anchors 61 being embedded in the filling as shown to hold the blocks 60 in place, and upon sufficient setting of the filling, insulating layers 62 and interior finish 63 may be applied as in the embodiments above described.

If it is desired to cast together the exterior finish layer and the main-body of the panel shown in Fig. 3, this may be done by providing suitable anchors or anchor blocks and employing bridging means such as the members 20, 25 of Fig. 1 or the means 57 of Fig. 4, to bridge the insulating air spaces 64, Fig. 3.

In the modified form of the invention shown in Figs. 5 and 6, the panel body is constructed in layers of different kinds of cementitious materials embedding and securely bonded together by the reinforcing means, thus enabling a more efficient use to be made of heat and sound insulating material without weakening the structure, and cheapening the cost of manufacture. In this form, which is illustrated as applied to a wall or roof panel, a plaster board or wood veneer inner facing sheet 65 of approximately the same length and width as the panel, is backed up by a layer or sheet 66 of insulex or other light weight, heat and sound insulating material, which may be applied in the plastic condition and will adhere strongly to the facing sheet.

Reinforcing members 67, 68, shown as channel shape strips of expanded or perforated sheet metal, are embedded in the backing layer 66 to approximately one-half of their depth, and thereby their inner flanges 69, which overlap the side and end edges of the facing sheet, are securely bonded to the facing sheet around its outer margin. Intermediate reinforcing members 70 are spaced about sixteen inches apart parallel to the long sides of the panel, extending from end to end thereof, as illustrated in Fig. 6, which is a typical section taken cross-wise of the panel. The face of the backing layer toward the outside of the panel body is advantageously coated with waterproofing material 71, preferably a viscous liquid which can be sprayed on to form a continuous film impregnating the surface of the insulex 66 or other material forming the backing layer for the inner facing sheet.

Next to the waterproofing 71, if used, I place a layer of rock-wool 72 or other heat and sound insulating material known for its lightness and resistance to the usual things causing disintegration or decay in buildings subject to wide variations in temperature and moisture conditions. Any dry, loose fibrous or granular material that can be compacted or felted into a layer and is not affected by heat and moisture will answer my purpose satisfactorily; but I find that rock wool is the best of the materials commonly available. The thickness of this packing material is such as to make its face nearly flush with the outer flanges 73 of the reinforcing members 68, 70 between which it is packed, except at the ends of the panel where it is tapered off and stopped short of the reinforcing members 67, as shown in Fig. 5.

Over the loose insulating layer 72 there is arranged one or more sheets 74 of metallic reinforcement, for example, expanded or perforated metal, extending the full length and width of the panel, and if preferred these sheets may be backed with waterproof paper. These sheets 74 may have their edges and ends inserted within the outer flanges 73 of the side and end reinforcing members 67, 68, and will preferably overlie the flanges 73 of the intermediate reinforcing members, as illustrated, and they are embedded in the outer layer 75 of concrete or similar plastic material having sufficient strength to bond the reinforcing members 74 securely to the flanges 73, thereby forming a rigid and strong panel structure. At the ends of the panel the concrete or other material forming the outer structural layer is thick enough to fill the entire space between the outer face of the body and the backing layer 66, thus providing a solid and strong end construction. Spaced holes 76 may be formed in the solid ends for dowel pins to secure the panels in place in the building wall or roof structure.

The form of panel illustrated in Figs. 5 and 6 is easily made by assembling the pre-formed parts on a table in a suitable frame and casting the layers one after the other as fast as they set. A suitable casting table may be made by securing together bottom and edge strips 77, 78, as shown in Fig. 5, upon which the inner facing sheet 65 is laid. The reinforcing members 67, 68, 70 are laid around the edges and across the facing sheet, and the aerated gypsum or other light weight plastic material used for the backing layer 66 is poured up to the height of the edge pieces of the table and screeded off level. This backing layer hardens quickly, and the waterproofing 71 is then sprayed on and allowed to dry, following which the rock-wool or other loose filling material 72 is spread and compacted in place between the reinforcing members and covered with waterproof paper and the sheet reinforcement 74. Paper backed metal lath or wire mesh reinforcement may be advantageously used for covering the filling material and supporting the outer structural layer 75 of concrete, which is poured flush with the upper screeds 79 to embed the exposed reinforcement. The screeds 78, 79 are shaped to provide a shallow corner rabbet all around the inner and outer edges of the panel body to take caulking or other joint finish when the panels are set in place in the building.

Any desired outer finish may be applied to the exposed face of the concrete, for example, sand, pebbles, stucco, or neat cement, and it may be brushed, hammered or otherwise treated, as desired. For fastening trim to wall panels and for roof panels to be covered with tiles or shingles, wood inserts may be cast in the concrete outer layer, preferably beneath the flanges 73 of the reinforcing members, by placing them before pouring the concrete, similarly to the construction illustrated in Fig. 3. This preserves the heat and sound insulating and fire resisting character of the panel.

My invention has the advantage of permitting the use of sheet metal, cast metal, stone, or other slabs as surface finishes, preferably backed with a layer of moisture, heat and sound proofing material, and the finish may be either attached to the panel body by any suitable fastening means, such as screws secured to the anchor blocks 14, 15 or 16, or anchored in place by tying-in members during the casting of the panels, as may be desired.

It should be clear to those skilled in the art from the foregoing description that my invention may be practiced in the production of other specific forms than these herein disclosed to illustrate its practice, and I therefore desire the description herein to be considered in all respects as illustrative and not restrictive.

I claim:

1. The method of forming a light weight, heat and sound proof, self-sustaining building panel of set plastic material and embedded reinforcing, which comprises positioning in spaced relation a plurality of "bond-in" reinforcing members of a height nearly equal to the thickness of the panel-body to be made, embedding the positioned reinforcing members to a portion of their depth with light weight heat and sound-proofing plastic material, assembling continuously backed metal mesh bridge members, mesh side up, in spaced relation to the poured filling between said reinforcing members, pouring filling material over the top of said bridge members to complete the filling of said body and to completely embed the reinforcing members, and allowing said filling to set.

2. The method of forming a light weight, heat and sound proof, self-sustaining building panel of set plastic material and embedded reinforcing, which comprises positioning in spaced relation a plurality of "bond-in" reinforcing members of a height substantially equal to the thickness of the panel body to be made, embedding the positioned reinforcing members to a portion of their depth with light weight heat and sound proofing plastic material, applying to the surface of said poured filling between said reinforcing members a waterproofing material, assembling waterproofed, continuously backed metal mesh bridge members, mesh side up, in spaced relation to the waterproofed area of the poured filling between said reinforcing members, pouring filling material over the top of said bridge members to complete the filling of said body to embed the reinforcing members, and allowing said filling to set.

3. The method of forming a light weight, heat and sound proof, self-sustaining building panel-body of set plastic material and embedded reinforcing, which comprises forming box-like reinforcing members of perforated reinforcing material, positioning said members in spaced relation to provide area reinforcement, embedding the area reinforcement thus formed to substantially half the depth of the members with plastic filling material, assembling continuously backed metal mesh bridge members, mesh side up, in spaced relation to the poured filling between said reinforcing members to define voids therein, pouring filling material over the top of said bridge members to complete the filling of said body to substantially the full depth of the box-like reinforcing members, and allowing said filling to set.

4. The method of forming a light weight, heat and sound proof, self-sustaining building panel body of set plastic material and embedded reinforcing, which comprises forming box-like reinforcing members of perforated reinforcing material, positioning said members in spaced relation to provide area reinforcement, embedding the area reinforcement thus formed to substantially half the depth of the members with plastic filling material, assembling continuously backed metal mesh bridge members, mesh side up, in spaced relation to the poured filling between said reinforcing members to define voids therein, applying a layer of waterproofing insulating material to a wall of said voids, pouring filling material over the top of said bridge members to complete the filling of said body to substantially the full depth of the box-like reinforcing members, and allowing said filling to set.

5. The method of forming a light weight, heat and sound proof, self-sustaining building panel body of set plastic material and embedded reinforcing, which comprises forming flange shape reinforcing members of perforated reinforcing material, positioning said members in spaced relation to provide area reinforcement, partially embedding the area reinforcement thus formed with plastic filling material, filling a portion of the remaining space between said reinforcing members with loose insulating material, assembling continuously backed metal mesh members, mesh side up, over said insulating material in the spaces between said reinforcing members to confine said insulation therein, pouring filling material over the top of said bridge members to complete the filling of said panel body to embed the full depth of the reinforcing members, and allowing said filling to set.

6. The method of forming a light weight, heat and sound proof, self-sustaining building panel body of set plastic material and embedded reinforcing, which comprises forming flange shape reinforcing members of perforated reinforcing material, positioning said members in spaced relation to provide area reinforcement, partially embedding the area reinforcement thus formed with plastic filling material, placing dry filling material in the spaces between said flange shape members, applying a layer of waterproofing material over said filling material, pouring cementitious material over the top of said dry filling material to complete the filling of said body to substantially the full depth of the spaced reinforcing members, and allowing said filling to set.

7. The method of forming a light weight, heat and sound proof, self-sustaining building panel of set plastic material and embedded reinforcing, which comprises supporting a facing sheet in a horizontal position, arranging perforated metal reinforcing members around the edges and acoss the upper face of said facing sheet, said reinforcing members having flanges overlying said sheet and adapted to be secured thereto, pouring a light weight plastic material in a layer to partly embed said reinforcing members, placing loose insulating material in the spaces between said reinforcing members, covering said loose insulating material with a sheet and metal reinforcement, and covering said sheet and embedding said metal reinforcement and the upper edges of said reinforcing members with a layer of cementitious material to bond them together when set.

8. The method of forming a light weight, heat and sound proof, self-sustaining building panel of set plastic material and embedded reinforcing, which comprises supporting a facing sheet in a horizontal position, arranging reticulated metal reinforcing members upon the upper face of said facing sheet, said reinforcing member having flanges overlying said sheet and adapted to be secured thereto, pouring a light weight plastic material in a layer to partly embed said reinforcing members and bond them to said sheet, placing loose material in the spaces between said reinforcing members and short of the ends of said sheet, covering said loose material with sheet material, and covering said sheet material and embedding the upper edges of said reinforcing members with a layer of cementitious material to bond them together when set.

9. The method of forming a light weight, heat and sound proof, self-sustaining building panel of set plastic material and embedded reinforcing, which comprises supporting a facing sheet in a horizontal position, arranging reticulated metal reinforcing members upon the upper face of said facing sheet, said reinforcing member having flanges overlying said sheet and adapted to be secured thereto, pouring a light weight plastic material in a layer to partly embed said reinforcing members and bond them to said sheet, placing loose material in the spaces between said reinforcing members and short of the ends of said sheet, covering said loose material with sheet material, covering said sheet material and embedding the upper edges of said reinforcing members with a layer of cementitious material to bond them together when set, and forming said layer with spaces recessed in its ends to receive alining and holding means when assembled in a building.

10. The method of forming a unitary, light weight, heat and sound proof, self-sustaining building panel of set plastic material and embedded reinforcing, which comprises supporting in spaced relation a plurality of "bond-in" reinforcing members of a depth less than the thickness of the finished panel, partly embedding said spaced reinforcing members in a layer of light weight heat and sound proofing plastic material, placing light weight supporting means on said layer in the spaces between said reinforcing members, filling over said supporting means to completely embed said spaced reinforcing members with a layer of cementitious plastic material, and allowing said plastic materials to set.

11. The method of forming a unitary, light weight, heat and sound-proof, self-sustaining building panel of set plastic material and embedded reinforcing, which comprises supporting in spaced relation a plurality of reticulated metal reinforcing members of a depth less than the thickness of the finished panel, partly embedding said spaced reinforcing members in a layer of light weight heat and sound proofing plastic material, placing light weight supporting means on said layer in the spaces between said reinforcing members, laying sheets of reticulated metal reinforcement over said supporting means across the spaces between said reinforcing members, filling over said supporting means to completely embed said spaced reinforcing members and reinforcement with a layer of cementitious plastic material, and allowing said plastic materials to set.

12. The method of forming a unitary, light weight, heat and sound proof, self-sustaining building panel of set plastic material and embedded reinforcing, which comprises supporting in spaced relation a plurality of "bond-in" reinforcing members of a depth less than the thickness of the finished panel, partly embedding said spaced reinforcing members in a layer of light weight heat and sound proofing plastic material, placing insulation means on said layer in the spaces between said reinforcing members, filling over said insulation with a plastic material supported by bridge members below the outer face of the said spaced reinforcing members, and allowing said plastic material to set.

13. The method of forming a unitary, light weight, heat and sound proof, self-sustaining building panel of set plastic material and embedded reinforcing, which comprises supporting a facing sheet in a horizontal position, placing on said sheet a plurality of flanged reticulated metal reinforcing members of a depth less than the thickness of the finished panel, partly embedding said spaced reinforcing members in a layer of light weight heat and sound proofing plastic material, placing a practically continuous insulation means on said layer between said reinforcing members, filling over said insulation with a plastic material and embedding the flanges of said spaced reinforcing members, and allowing said plastic material to set.

14. The method of forming a building panel which comprises casting a body layer of aerated gypsum on a facing sheet upon which strips of reticulated metal have been positioned in planes transverse to the plane of the sheet to partly embed said strips, laying dry insulating material over said body layer between said strips, and casting a second body layer of cementitious material on said dry insulating material to embed the upper edges of said strips, whereby said insulating material is secured in place and said body layers are securely connected by said strips to form a rigid self-supporting structure.

15. The method of forming a building panel which comprises casting a body layer of aerated gypsum on a facing sheet upon which strips of reticulated metal have been positioned in planes transverse to the plane of the sheet to partly embed said strips, laying dry insulating material over said body layer between said strips, covering said insulating material with continuous waterproofing material, supporting metal reinforcement thereon, and casting a second body layer of cementitious material on said dry insulating material to embed the upper edges of said strips and said reinforcement, whereby said insulating material is secured in place and said body layers are reinforced and securely connected by said metal reinforcement and strips to form a rigid self-supporting structure.

THOMAS J. FOSTER.